United States Patent
Kim et al.

(10) Patent No.: US 9,663,651 B2
(45) Date of Patent: May 30, 2017

(54) HIGH-GLOSS POLYMETHYLMETHACRYLATE ACRYLIC COPOLYMER ALLOY COMPOSITION AND MOLDED ARTICLE

(71) Applicant: LG CHEM, LTD., Seoul (KR)

(72) Inventors: Min Hee Kim, Daejeon (KR); Sung Ho Lee, Daejeon (KR); Myeung Il Kim, Daejeon (KR); Jae Hwan Kim, Daejeon (KR); Min Ho Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/035,185

(22) PCT Filed: Nov. 19, 2015

(86) PCT No.: PCT/KR2015/012414
§ 371 (c)(1),
(2) Date: May 6, 2016

(87) PCT Pub. No.: WO2016/080758
PCT Pub. Date: May 26, 2016

(65) Prior Publication Data
US 2016/0340505 A1 Nov. 24, 2016

(30) Foreign Application Priority Data

Nov. 21, 2014 (KR) .................. 10-2014-0163097
Nov. 18, 2015 (KR) .................. 10-2015-0161560

(51) Int. Cl.
*C08L 51/00* (2006.01)
*C08L 33/12* (2006.01)
*C08L 33/10* (2006.01)
*C08F 265/04* (2006.01)
*C08L 33/08* (2006.01)

(52) U.S. Cl.
CPC ............ *C08L 33/12* (2013.01); *C08F 265/04* (2013.01); *C08L 33/10* (2013.01); *C08L 33/08* (2013.01); *C08L 2205/02* (2013.01); *C08L 2205/025* (2013.01); *C08L 2205/03* (2013.01); *C08L 2205/035* (2013.01); *C08L 2205/06* (2013.01); *C08L 2207/53* (2013.01)

(58) Field of Classification Search
CPC ......... C08L 2205/035; C08L 2205/025; C08L 2207/53; C08L 2205/06; C08L 33/12
USPC ........................................... 524/504
See application file for complete search history.

(56) References Cited

U.S. PATENT DOCUMENTS 4,831,079 A * 5/1989 Ting .................. C08L 25/18
524/504

FOREIGN PATENT DOCUMENTS

| KR | 1020070047464 A | 5/2007 |
| KR | 100962368 B1 | 6/2010 |
| KR | 1020120050138 A | 5/2012 |
| KR | 1020140005510 A | 1/2014 |

* cited by examiner

Primary Examiner — Hui Chin
(74) Attorney, Agent, or Firm — Dentons US LLP

(57) ABSTRACT

The present invention relates to a high-gloss polymethylmethacrylate-acrylic copolymer alloy composition and a molded article. According to the present invention, provided are a high-gloss polymethylmethacrylate-acrylic copolymer alloy composition which provides improved surface gloss and transparency (color) while providing mechanical strength, workability, and scratch resistance required in the high-gloss polymethylmethacrylate-acrylic copolymer alloy composition by combining a specific amount of an acrylic impact modifier, as an impact modifier of an alloy of a polymethylmethacrylate resin and an acrylic copolymer, with a scratch modifier and are economically efficient by omitting a process after injection (painting process), and a molded article obtained from the same.

14 Claims, No Drawings

HIGH-GLOSS POLYMETHYLMETHACRYLATE ACRYLIC COPOLYMER ALLOY COMPOSITION AND MOLDED ARTICLE

This application is a National Stage Entry of International Application No. PCT/KR2015/012414, filed on Nov. 19, 2015, and claims the benefit of and priority to Korean Application No. 10-2015-0161560, filed on Nov. 18, 2015 and Korean Application No. 10-2014-0163097, filed Nov. 21, 2014, both of which are incorporated herein by reference in their entirety for all purposes as if fully set forth herein

TECHNICAL FIELD

The present invention relates to a high-gloss polymethylmethacrylate-acrylic copolymer alloy composition and a molded article. More particularly, the present invention relates to a high-gloss polymethylmethacrylate-acrylic copolymer alloy composition to provide improved surface gloss and transparency (color) while providing mechanical strength, workability, and scratch resistance required in the high-gloss polymethylmethacrylate-acrylic copolymer alloy composition by combining a specific amount of an acrylic impact modifier, as an impact modifier of an alloy of a polymethylmethacrylate resin and an acrylic copolymer, with a scratch modifier, and a molded article obtained from the same.

BACKGROUND ART

Polymethylmethacrylate (PMMA), as a synthetic resin using an MMA monomer as a main material, has excellent transparency, compared to other plastics. In addition, PMMA has superior scratch resistance due to high surface hardness. Further, PMMA has excellent chemical resistance, surface gloss, and adhesion, as well as excellent weather resistance. Due to the aforementioned properties, PMMA is broadly used in materials of automobiles and electrical and electronic components. However, due to poor impact resistance of PMMA, the thicknesses of products to which PMMA is applied are increased or the products are limitedly used. So as to improve such low impact resistance of PMMA resin, a method of modifying a PMMA resin with an acrylonitrile-butadiene-styrene (ABS) resin is used. However, this method has a disadvantage of poor weather resistance by a double bond of butadiene. Accordingly, PMMA resin is modified with acrylonitrile-styrene-butyl acrylate (ASA) and a silicon-based impact modifier, instead of ABS resin, whereby impact resistance is improved. However, in the case of PMMA resin modified like this, scratch resistance, gloss, and transparency are decreased, compared to conventional PMMA resin (related prior document: Korean Laid-Open Publication No. 2002-0022351).

DISCLOSURE

Technical Problem

Therefore, the present invention has been made in view of the above problems, and it is one object of the present invention to provide a high-gloss polymethylmethacrylate-acrylic copolymer alloy composition to provide improved surface gloss and color while providing mechanical strength, workability, and scratch resistance required in the high-gloss polymethylmethacrylate-acrylic copolymer alloy composition by combining a specific amount of an acrylic impact modifier, as an impact modifier of an alloy of a polymethylmethacrylate resin and an acrylic copolymer, with a scratch modifier, and a molded article obtained from the same.

Technical Solution

In accordance with one aspect of the present invention, provided is a high-gloss polymethylmethacrylate-acrylic copolymer alloy composition, including 12 to 50 parts by weight of an acrylic copolymer, 6 to 25 parts by weight of an acrylic impact modifier, and 0.5 to 5 parts by weight of a scratch modifier based on 100 parts by weight of a polymethylmethacrylate resin.

In accordance with one aspect of the present invention, provided is a molded article including the aforementioned high-gloss polymethylmethacrylate-acrylic copolymer alloy composition.

Advantageous Effects

As apparent from the fore-going, the present invention advantageously provides a high-gloss polymethylmethacrylate-acrylic copolymer alloy composition which provides improved surface gloss and transparency (color) while providing mechanical strength, workability, and scratch resistance required in the high-gloss polymethylmethacrylate-acrylic copolymer alloy composition by combining a specific amount of an acrylic impact modifier, as an impact modifier of an alloy of a polymethylmethacrylate resin and an acrylic copolymer, with a scratch modifier and are economically efficient by omitting a process after injection (painting process), and a molded article obtained from the same.

BEST MODE

Now, the present invention will be described in more detail.

A high-gloss polymethylmethacrylate-acrylic copolymer alloy composition according to the present invention includes 12 to 50 parts by weight of an acrylic copolymer, 6 to 25 parts by weight of an acrylic impact modifier, and 0.5 to 5 parts by weight of a scratch modifier based on 100 parts by weight of a polymethylmethacrylate resin.

The polymethylmethacrylate resin is not specifically limited so long as it is a polymer generally called polymethylmethacrylate resin or PMMA resin in the field of the present invention. For example, the polymethylmethacrylate resin may be a methyl methacrylate homopolymer, a copolymer of methyl methacrylate and acrylate, or a mixture thereof.

The acrylic copolymer may be, for example, a copolymer of an acrylic rubber core-graft shell, or a graft copolymer of an alkyl acrylate-vinyl aromatic compound-vinyl cyan compound. In a specific example, the acrylic copolymer may be a copolymer formed by grafting 50 to 60% by weight of a mixture of the styrene based monomer and acrylonitrile based monomer with 40 to 50% by weight of the acrylic rubber. In addition, the amount of the acrylonitrile based monomer inside a shell may be 20 to 35% by weight based on 100% by weight of a total of the rubber and monomers constituting the copolymer.

Alkyl of the alkyl acrylate may be, for example, $C_1$ to $C_{20}$ alkyl, or $C_1$ to $C_{10}$ alkyl.

The acrylic rubber may be, for example, an alkyl acrylate rubber, the styrene based monomer may be a vinyl aromatic compound including styrene, and the acrylonitrile based monomer may be a vinyl cyan compound including acrylonitrile.

The acrylic copolymer may be included in an amount of, for example, 12 to 50 parts by weight, 18 to 35 parts by weight, or 18 to 32 parts by weight based on 100 parts by weight of the polymethylmethacrylate resin. Within this range, impact resistance, color, scratch resistance, and surface gloss are improved.

The acrylic impact modifier may be, for example, a resin wherein an acrylonitrile-styrene based copolymer and an acrylic monomer are crosslinked.

The acrylonitrile-styrene based copolymer may be a vinyl cyan compound-vinyl aromatic compound copolymer including an acrylonitrile-styrene copolymer.

The acrylic impact modifier has a higher shell graft rate than the acrylic copolymer, thus maximally and satisfactorily enveloping an acrylic rubber such as a butyl acrylate rubber most greatly affecting colorability. Accordingly, colorability and gloss may be improved.

In a specific example, when the acrylic impact modifier includes 5 to 10% by weight of a styrene based seed, 50 to 60% by weight of an acrylic core enveloping the seed, and 30 to 40% by weight of a styrene based shell enveloping the core, gloss and color (transparency) are preferably improved.

The styrene based seed and the styrene based shell may be each independently selected from a styrene based homopolymer and a styrene-acrylonitrile based copolymer.

When the styrene based seed and/or the acrylic core each independently includes 0.1 to 5% by weight or 0.5 to 3% by weight of a crosslinkable monomer based on 100% by weight of total ingredients constituting the acrylic impact modifier, a crosslinking structure between the styrene based seed and the acrylic core, or a crosslinking structure between the acrylic core and the styrene based shell may be accomplished.

Each of the styrene based seed, styrene based shell, and the like according to the present invention may mean a polymer seed or a polymer shell polymerized with a vinyl aromatic compound, etc.

The acrylic core of the present invention may be a polymer polymerized with alkyl acrylate, etc.

The crosslinkable monomer may be, for example, at least one selected from among divinylbenzene, ethylene glycol dimethacrylate, diethylene glycol dimethacrylate, triethylene glycol dimethacrylate, 1,3-butylene glycol dimethacrylate, aryl methacrylate, and 1,3-butylene glycol diacrylate.

The acrylic impact modifier is included in an amount of, for example, 6 to 25 parts by weight, 6 to 15 parts by weight, or 6 to 11 parts by weight, based on 100 parts by weight of the polymethylmethacrylate resin. Within this range, impact resistance may be improved without affecting color and surface gloss.

The scratch modifier may be, for example, a siloxane based polymer or an organically modified siloxane based polymer.

In a specific example, the siloxane based polymer may be an organic siloxane based polymer, and the organic siloxane based polymer may be a polydialkyl siloxane polymer to which $C_1$ to $C_{10}$ alkyl is bonded.

In a specific example, the organically modified siloxane based polymer may be a polymer, a main chain of which is substituted with an alkyl group, an aryl group, an allyl group, an alkenyl group, an amino group, an halogenated alkyl group, an epoxy group, a carboxyl group, a hydroxy group, an alkoxy group, a methylhydrogen group, or the like.

In a more specific example, the organic modified siloxane based polymer may be a polymer formed by substituting a terminal (X site) of a polymer of a polydimethylsiloxane of Formula 1 below with a functional group represented by Formula 2 or 3 below. Preferably, the polymer is substituted with a functional group represented by Formula 3. Additionally, the scratch modifier may be an oil type modifier or gum type modifier.

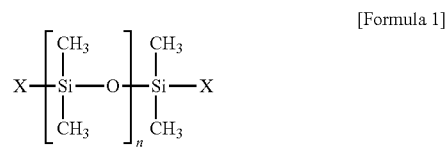

[Formula 1]

wherein X is represented by Formula 2 or 3 below and n is an integer of 1 or more.

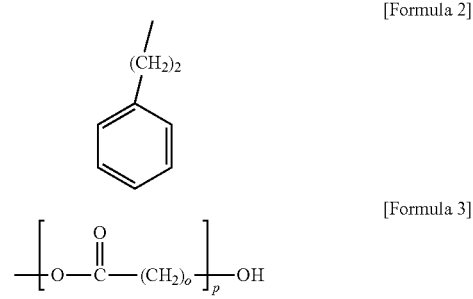

[Formula 2]

[Formula 3]

wherein o and p of Formula 3 are each an integer of 1 or more.

n may be, for example, 1 to 1,000, or 10 to 500.

Each of o and p may be, for example, 1 to 100, or 1 to 50.

The scratch modifier may be included in an amount of, for example, 0.5 to 5 parts by weight, or 0.6 to 4.5 parts by weight based on 100 parts by weight of the polymethylmethacrylate resin. Within this range, scratch resistance may be improved without affecting color and surface gloss.

As needed, the alloy composition may include one or more additives selected from among an impact modifier, a lubricant, a heat stabilizer, a UV stabilizer, an anti-dripping agent, a pigment, a dye, and an inorganic filler.

The scratch resistance (ΔL) of the alloy composition measured by an Erichsen test may be, for example, greater than 0.5 and less than 1.5, greater than 0.5 and 1.1 or less, 0.6 or more and less than 1.5, or 0.6 to 1.1.

The gloss (45°) of the alloy composition measured according to ASTM D2457 may be, for example, greater than 87.0, 89.0 or more, greater than 87.0 and 92.0 or less, or 89.0 to 92.0.

A color value, which is represented by L*, of the alloy composition measured by COLOR-EYE 7000 Series (CE 7000A) may be, for example, greater than 2.9, less than 5.5, 3.5 or more and less than 5.5, greater than 2.9 and 4.0 or less, or 3.5 to 4.0.

The Izod impact strength of the alloy composition measured according to ASTM D256 may be greater than 3.5 kg·cm/cm, less than 6.5 kg·cm/cm, greater than 3.5 kg·cm/ cm and 5.5 kg·cm/cm or less, 3.8 kg·cm/cm or more and less than 6.5 kg·cm/cm, or 3.8 kg·cm/cm to 5.5 kg·cm/cm.

The melt index (g/10 min) of the alloy composition measured at 220° C. under a load of 10.0 kg according to ASTM D1228 may be, for example, greater than 3.8 g/10 min, less than 7.6 g/10 min, greater than 3.8 g/10 min and 5.0 g/10 min or less, 4.0 g/10 min to 7.6 g/10 min, or 4.0 g/10 min to 5.0 g/10 min.

In accordance with the present invention, a molded article including the high-gloss polymethylmethacrylate-acrylic copolymer alloy composition may be provided.

The molded article may be, for example, an injected mold.

The molded article may be, for example, an automobile exterior material such as a side mirror, a pillar garnish, or the like. In particular, since the high-gloss polymethylmethacrylate-acrylic copolymer alloy composition has superior surface gloss as well as scratch resistance, it may be applied to unpainted products. In addition, when a black pigment is added thereto and then extrusion is performed, improved black color tone, slip, etc. may be provided together.

Now, the present invention will be described in more detail with reference to the following examples. These examples are provided only for illustration of the present invention and should not be construed as limiting the scope and spirit of the present invention.

EXAMPLES

Specifications of each ingredient used in examples and comparative examples below are as follows:

PMMA: Polymethylmethacrylate (manufactured by LG chemistry)

ASA: Poly(acrylonitrile-styrene-butyl acrylate), as a copolymer formed by grafting 40 to 50% by weight of an acrylic rubber with 50 to 60% by weight of styrene/acrylonitrile and containing 27.27% by weight of acrylonitrile in a shell.

Silicon-based impact modifier: Has a silicon/acrylic core and a methyl methacrylate copolymer shell, manufactured by MITSUBISHI RAYON.

Acrylic impact modifier: A copolymer (manufactured by GANZ CHEMICAL) including 5 to 10% by weight of a styrene based seed (polymer including only styrene), 50 to 60% by weight of an acrylic core enveloping the seed, and 30 to 40% by weight of a styrene based shell enveloping the core, wherein the styrene based seed and the acrylic core respectively include 1% by weight of divinylbenzene based on 100% by weight of a total of ingredients constituting the acrylic impact modifier.

Scratch modifier: Polydimethylsiloxane (manufactured by EVONIK INDUSTRIES)

Examples 1 to 5, Control Examples 1 to 2, and Comparative Examples 1 to 5

Ingredients summarized in Table 1 below were added in amounts summarized in the table, and a black pigment was added thereto, followed by melt extruding at 250 to 280° C. by means of a twin-screw extruder. After the extrusion, pelletizing was carried out and then drying was carried out at 80° C. for four or more hours. Subsequently, injection molding was carried out, followed by standing at room temperature for 48 hours or more. As a result, injection molded specimens were prepared.

TABLE 1

| Classification (parts by weight) | Examples | | | | | Control Examples | | Comparative Examples | | | | |
|---|---|---|---|---|---|---|---|---|---|---|---|---|
| | 1 | 2 | 3 | 4 | 5 | 1 | 2 | 1 | 2 | 3 | 4 | 5 |
| PMMA | 100 | 100 | 100 | 100 | 100 | 100 | — | 100 | 100 | 100 | 100 | 100 |
| ASA* | 18.87 | 19.48 | 20.27 | 24.32 | 31.43 | — | 100 | 11.76 | 54.55 | 18.87 | 19.79 | 49.09 |
| Silicon-based impact modifier* | — | — | — | — | — | — | — | — | — | 6.29 | — | — |
| Acrylic impact modifier* | 6.29 | 6.49 | 10.81 | 6.76 | 7.14 | — | — | 5.88 | 27.27 | — | 6.60 | 27.27 |
| Scratch modifier* | 0.63 | 3.90 | 4.05 | 4.05 | 4.29 | — | — | — | — | 0.63 | 6.0 | 5.46 |

*Based on 100 parts by weight of PMMA (parts by weight)

Properties of the injected specimens were measured according to the following methods. Results are summarized in Table 2.

<Property Evaluation>

Scratch resistance (ΔL): Measured by Erichsen test and then represented by ΔL.

Gloss (45°): Measured according to ASTM D2457.

Color: Measured by means of COLOR-EYE 7000 Series (CE 7000A) and then represented by L*.

Izod impact strength (kg·cm/cm): Measured according to ASTM D256.

Melt Index (g/10 min): Measured at 220° C. under a load of 10.0 kg according to ASTM D1228.

TABLE 2

| Classification | Examples | | | | | Control Examples | | Comparative Examples | | | | |
|---|---|---|---|---|---|---|---|---|---|---|---|---|
| | 1 | 2 | 3 | 4 | 5 | 1 | 2 | 1 | 2 | 3 | 4 | 5 |
| Scratch resistance (ΔL) | 1.1 | 0.6 | 0.7 | 0.8 | 1.0 | 0.3 | 11.6 | 1.5 | 3.0 | 0.9 | 0.5 | 2.5 |

TABLE 2-continued

|  | Examples | | | | | Control Examples | | Comparative Examples | | | | |
| --- | --- | --- | --- | --- | --- | --- | --- | --- | --- | --- | --- | --- |
| Classification | 1 | 2 | 3 | 4 | 5 | 1 | 2 | 1 | 2 | 3 | 4 | 5 |
| Gloss (45°) | 92.0 | 91.0 | 91.0 | 90.0 | 89.0 | 95.0 | 85.0 | 93.0 | 85.0 | 87.0 | 87 | 83.5 |
| Color (L*) | 3.5 | 3.7 | 3.7 | 3.8 | 4.0 | 2.9 | 9.3 | 3.2 | 7.1 | 5.9 | 5.5 | 7.5 |
| Izod impact strength | 3.8 | 4.0 | 4.5 | 4.5 | 5.5 | 1.0 | 10.3 | 2.5 | 6.5 | 4.8 | 3.5 | 6.4 |
| Melt Index (g/10 min) | 4.0 | 4.2 | 4.2 | 4.5 | 5.0 | 2.0 | 12.0 | 3.0 | 7.6 | 4.8 | 3.8 | 7.7 |

As shown in Table 2, it can be confirmed that, in the cases of Examples 1 to 5 in which the alloy of the polymethylmethacrylate resin and the acrylic copolymer includes the acrylic impact modifier and the scratch modifier in a suitable content range, scratch resistance, gloss, color (black color tone, transparency), impact strength, and a melt index are improved.

In particular, it can be confirmed that impact strength and a melt index increase with increasing acrylic copolymer content, and scratch resistance increases with increasing scratch modifier content.

Meanwhile, impact strength and a melt index are poor in the case of Control Example 1 in which a neat PMMA resin is used, and scratch resistance, gloss, and color are poor in Control Example 2 in which a neat ASA resin is used.

In addition, it can be confirmed that, in the case of Comparative Example 1 in which the acrylic copolymer and the acrylic impact modifier are included in an amount less than a suitable amount and the scratch modifier is not included, somewhat poor scratch resistance, impact strength, and a melt index are exhibited, compared to Examples 1 to 5.

Further, it can be confirmed that, in the case of Comparative Examples 2 in which the acrylic copolymer and the acrylic impact modifier are included in an amount greater than a suitable amount and the scratch modifier is not included, remarkably poor scratch resistance, gloss, and color are exhibited, compared to Examples 1 to 5.

In particular, it can be confirmed that, in the case of Comparative Examples 3 in which the silicon-based impact modifier is used instead of the acrylic impact modifier, scratch resistance, gloss, and color are considerably poor, compared to Examples 1.

In addition, it can be confirmed that, in the case of Comparative Example 4 in which the scratch modifier is added in a large amount, scratch resistance is improved, but gloss, color, Izod impact strength, and melt index are decreased, compared to Examples 1 to 5.

In addition, it can be confirmed that, in the case of Comparative Examples 5 in which the acrylic impact modifier and the scratch modifier are included in an amount greater than an upper limit in a suitable amount range, scratch resistance, gloss, and color are remarkably poor, compared to Examples 1 to 5.

In conclusion, it can be confirmed that, when the high-gloss polymethylmethacrylate-acrylic copolymer alloy composition prepared using a specific amount of the acrylic impact modifier, as an impact modifier of the alloy of the polymethylmethacrylate resin and the acrylic copolymer, along with the specific scratch modifier according to the present invention is used, a molded article having improved gloss, scratch resistance, color (transparency, black color tone), etc. is manufactured. As a result, costs due to additional painting after injection may be reduced, thus being economically efficient.

The invention claimed is:

1. A polymethylmethacrylate-acrylic copolymer alloy composition, comprising 12 to 50 parts by weight of an acrylic copolymer, 6 to 25 parts by weight of an acrylic impact modifier, and 0.5 to 5 parts by weight of a scratch modifier based on 100 parts by weight of a polymethylmethacrylate resin.

2. The polymethylmethacrylate-acrylic copolymer alloy composition according to claim 1, wherein the polymethylmethacrylate resin is a methyl methacrylate homopolymer, a methyl methacrylate-acrylate copolymer, or a mixture thereof.

3. The polymethylmethacrylate-acrylic copolymer alloy composition according to claim 1, wherein the acrylic copolymer is a copolymer formed by grafting 50 to 60% by weight of a styrene based monomer and acrylonitrile based monomer with 40 to 50% by weight of an acrylic rubber, wherein an amount of an acrylonitrile monomer inside a shell is 20 to 35% by weight based on 100% by weight of the acrylic rubber and the monomers constituting the copolymer.

4. The polymethylmethacrylate-acrylic copolymer alloy composition according to claim 1, wherein the acrylic impact modifier is a resin in which an acrylonitrile-styrene copolymer and an acrylic monomer are crosslinked.

5. The polymethylmethacrylate-acrylic copolymer alloy composition according to claim 1, wherein the acrylic impact modifier comprises 5 to 10% by weight of a styrene based seed, 50 to 60% by weight of an acrylic core enveloping the seed, and 30 to 40% by weight of a styrene based shell enveloping the core.

6. The polymethylmethacrylate-acrylic copolymer alloy composition according to claim 5, wherein the styrene based seed and the styrene based shell are each independently selected from a styrene based homopolymer and a styrene-acrylonitrile based copolymer.

7. The polymethylmethacrylate-acrylic copolymer alloy composition according to claim 5, wherein the styrene based seed and the acrylic core each independently comprise 0.1 to 5% by weight of a crosslinkable monomer based on 100% by weight of total ingredients constituting the acrylic impact modifier.

8. The polymethylmethacrylate-acrylic copolymer alloy composition according to claim 7, wherein the crosslinkable monomer is at least one selected from among divinylbenzene, ethylene glycol dimethacrylate, diethylene glycol dimethacrylate, triethylene glycol dimethacrylate, 1,3-butylene glycol dimethacrylate, aryl methacrylate, and 1,3-butylene glycol diacrylate.

9. The polymethylmethacrylate-acrylic copolymer alloy composition according to claim 1, wherein the scratch modifier is a siloxane based polymer or an organically modified siloxane based polymer.

10. The polymethylmethacrylate-acrylic copolymer alloy composition according to claim 9, wherein the siloxane based polymer is a polydialkylsiloxane polymer comprising $C_1$ to $C_{10}$ alkyl bonded thereto.

11. The polymethylmethacrylate-acrylic copolymer alloy composition according to claim 9, wherein the organically modified siloxane based polymer is a polymer formed by bonding one or more functional groups selected from Formulas 2 and 3 below with a terminal of polydimethylsiloxane represented by Formula 1 below:

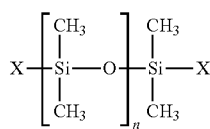
[Formula 1]

wherein X is represented by Formula 2 or 3 below and n is an integer of 1 or more,

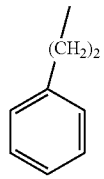
[Formula 2]

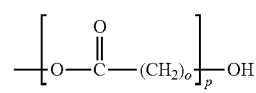
[Formula 3]

wherein each of o and p of Formula 3 are an integer of 1 or more.

12. The polymethylmethacrylate-acrylic copolymer alloy composition according to claim 1, wherein the alloy composition comprises one or more additives selected from among an impact modifier, a lubricant, a heat stabilizer, a UV stabilizer, an anti-dripping agent, a pigment, a dye, and an inorganic filler.

13. A molded article comprising the polymethylmethacrylate-acrylic copolymer alloy composition according to claim 1.

14. The molded article according to claim 13, wherein the molded article is an unpainted automobile exterior material.

* * * * *